(12) United States Patent
Jackson et al.

(10) Patent No.: US 6,635,334 B1
(45) Date of Patent: Oct. 21, 2003

(54) CLOTH-LIKE POLYMERIC FILMS

(75) Inventors: Jeffery Jackson, Woodbury, MN (US); Dennis L. Krueger, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 151 days.

(21) Appl. No.: 09/634,000

(22) Filed: Aug. 8, 2000

(51) Int. Cl.[7] ................................................. B32B 3/24
(52) U.S. Cl. .................. 428/136; 428/43; 428/138; 428/137; 428/132; 428/156; 428/192; 428/343; 428/134
(58) Field of Search .................. 428/43, 136, 138, 428/137, 132, 156, 192, 343, 134

(56) References Cited

U.S. PATENT DOCUMENTS

| | | | |
|---|---|---|---|
| 2,687,978 A | * 8/1954 | Vogt | ........................... 428/43 |
| 3,038,198 A | 6/1962 | Schaar | |
| 3,394,211 A | 7/1968 | MacDuff | |
| 3,467,250 A | * 9/1969 | Delia et al. | .................. 206/411 |
| 3,649,431 A | * 3/1972 | Parker | ......................... 428/137 |
| 3,985,600 A | 10/1976 | Blais | |
| 4,015,917 A | 4/1977 | Ericson | |
| 4,217,327 A | * 8/1980 | Cancio et al. | ............... 264/284 |
| 4,248,822 A | 2/1981 | Schmidt | |
| 4,330,499 A | 5/1982 | von und zu Aufsess et al. | |
| 4,451,533 A | 5/1984 | Wong et al. | |
| 4,522,854 A | * 6/1985 | Sharps, Jr. | ................ 229/87.05 |
| 4,581,087 A | * 4/1986 | Johnson | ....................... 156/209 |
| 4,595,738 A | 6/1986 | Hufnagel et al. | |
| 4,609,107 A | 9/1986 | Martin et al. | |
| 4,675,582 A | 6/1987 | Hommes et al. | |
| 4,825,111 A | 4/1989 | Hommes et al. | |
| 4,853,602 A | 8/1989 | Hommes et al. | |
| 4,978,486 A | 12/1990 | Ito et al. | |
| 5,036,262 A | 7/1991 | Schonbach | |
| 5,051,225 A | 9/1991 | Hommes et al. | |
| 5,072,493 A | 12/1991 | Hommes et al. | |
| 5,141,795 A | * 8/1992 | Kai et al. | ................... 428/136 |
| 5,212,011 A | 5/1993 | Ishikawa et al. | |
| 5,536,555 A | * 7/1996 | Zelazoski et al. | ........... 128/849 |
| 5,560,966 A | 10/1996 | Kishimoto et al. | |
| 5,637,368 A | * 6/1997 | Cadalbert et al. | ........... 252/511 |
| 5,648,142 A | * 7/1997 | Phillips | ..................... 428/132 |
| 5,830,555 A | * 11/1998 | Srinivasan et al. | ......... 428/131 |

FOREIGN PATENT DOCUMENTS

| | | |
|---|---|---|
| EP | 0 418 773 A2 | 3/1991 |
| GB | 851053 | 10/1960 |
| GB | 851473 | 10/1960 |
| GB | 1012963 | 7/1967 |
| GB | 2 214 450 A | 9/1989 |
| GB | 2313338 A | 11/1997 |
| WO | WO 96/24549 | 8/1996 |

\* cited by examiner

*Primary Examiner*—William P. Watkins, III
(74) *Attorney, Agent, or Firm*—Colene H. Blank

(57) ABSTRACT

A polymeric film having a plurality of perforations is described. The polymeric film provides a strong, high-tensile strength material that permits hand tearing of the film along one or two axes. In specific implementations, the polymeric film is incorporated into a multi-layer film having cloth-like properties of strength and tear propagation, and is suitable for use various adhesive tape applications. Methods of making the polymeric film are also disclosed.

61 Claims, 5 Drawing Sheets

CLOTH-LIKE POLYMERIC FILMS

FIELD OF THE INVENTION

The present invention relates to cloth-like polymeric films and products made therefrom, including polymeric backings for adhesive tapes.

BACKGROUND OF THE INVENTION

Adhesive tapes containing a woven cloth backing are widely used, such as in conventional duct tapes sold to consumers and professionals. One of the advantages of using woven cloth as a tape backing is that it provides a combination of high tensile strength and low elongation to break in both the length or machine direction ("MD") of the tape and in the width, or transverse direction ("TD") of the tape. For many applications, this high strength and low elongation can be very important. Another advantage provided by tape backings is the relative ease of straight-line tearing along each of these two principle directions. Woven cloth backings also have drape and conformability characteristics which are desirable in many tape applications, and provide an appearance or "look" that is considered desirable in the marketplace for many kinds of adhesive tapes that have traditionally been made with woven cloth backings.

Woven cloth also has several disadvantages as an adhesive tape backing. In many applications, its woven structure must be saturated by the adhesive used in the tape, leading to the use of larger amounts of adhesive than for a film-backed tape. In some applications, a smooth or non-fibrillar top surface of the tape is desired, so the cloth backing must be overlaminated or coated. Also, hand-tearing cloth-backed tapes frequently results in loose fibers protruding from one or both torn edges. Finally, cloth backings are generally more expensive than polymer film backings.

For these reasons, a desire exists for a polymer film tape backing which combines, at low cost, the strength, elongation, tear, and conformability properties of woven fabric without the aforementioned disadvantages.

SUMMARY OF THE INVENTION

The present invention is directed to a polymeric film suitable for use as a backing material for tapes, as well as for use in other applications that require high tensile strength and straight-line tearing. The polymeric film has a plurality of perforations configured and arranged in a manner such that the film exhibits many of the properties of cloth materials. The configuration and arrangement of the perforations provide a film that can be readily torn in straight or substantially straight lines, yet has a sufficient tensile strength to be used in adhesive tape applications.

In specific implementations, the polymeric film comprises a composite film including a first polymeric film with a plurality of perforations, and a second polymeric film applied to the first polymeric film and substantially covering the perforations. The perforated film provides improved tearing properties, while the second film provides additional strength, durability, impermeability, or other desirable properties. In specific implementations an adhesive composition, such as a pressure sensitive adhesive, is applied to the film to make an adhesive tape.

The composite polymeric film is typically tearable by hand in at least one direction, and can be formed such that it is hand tearable in two perpendicular directions. The polymeric films of the invention have relatively low tear initiation energy and relatively high tear propagation energy compared to similar polymeric films that are not perforated in accordance with the invention. In addition, the perforated films of the invention allow tearing of the films in substantially straight lines compared to similar polymeric films that have not been perforated in accordance with the invention. The perforations allow such improved tear properties without excessively weakening the tensile strength of the film, and additionally provide a desirable reduction in the tensile elongation to break of the film.

Suitable polymers for the polymeric film include polyolefins, such as polypropylene for the first film and polyethylene for the second film. Various other polymers may be used. In certain implementations, multiple layers of films are combined to make a final composite film. In such implementations it is sometimes desirable to coextrude layers having high affinity for one another.

The perforations in the polymeric film are preferably non-circular and have a length at least 1.5 times their width, and typically at least 2 times their width. Although the perforations can show variations across the film, they typically each have a major axis and a minor axis. The major axis is a line along the length of the perforation, and the minor axis is a line along the width of the perforation. In one implementation, a line projected along the major axis of each perforation passes through an adjacent second perforation. In specific implementations a line projected along the major axis of each perforation passes through an adjacent perforation along or parallel to the minor axis of the adjacent perforation.

The invention is also directed to a method of making a composite polymeric film, the method including providing a first polymeric film comprising a first polymeric composition; perforating the first polymeric film; and applying a second film. The first film can be perforated with an infrared light source, a flame, or other method, and the film can be biaxially oriented prior to being perforated. In such implementations, perforation by radiation, flame, or other source of heat results in formation of a raised ridge along the edge of each perforation. This raised edge typically improves the tearing properties of the film.

The above summary of the present invention is not intended to describe each discussed embodiment of the present invention. This is the purpose of the figures, detailed description, and claims which follow.

BRIEF DESCRIPTION OF THE DRAWINGS

The invention will be further understood by the attached figures, which are summarized below.

Figure 1:
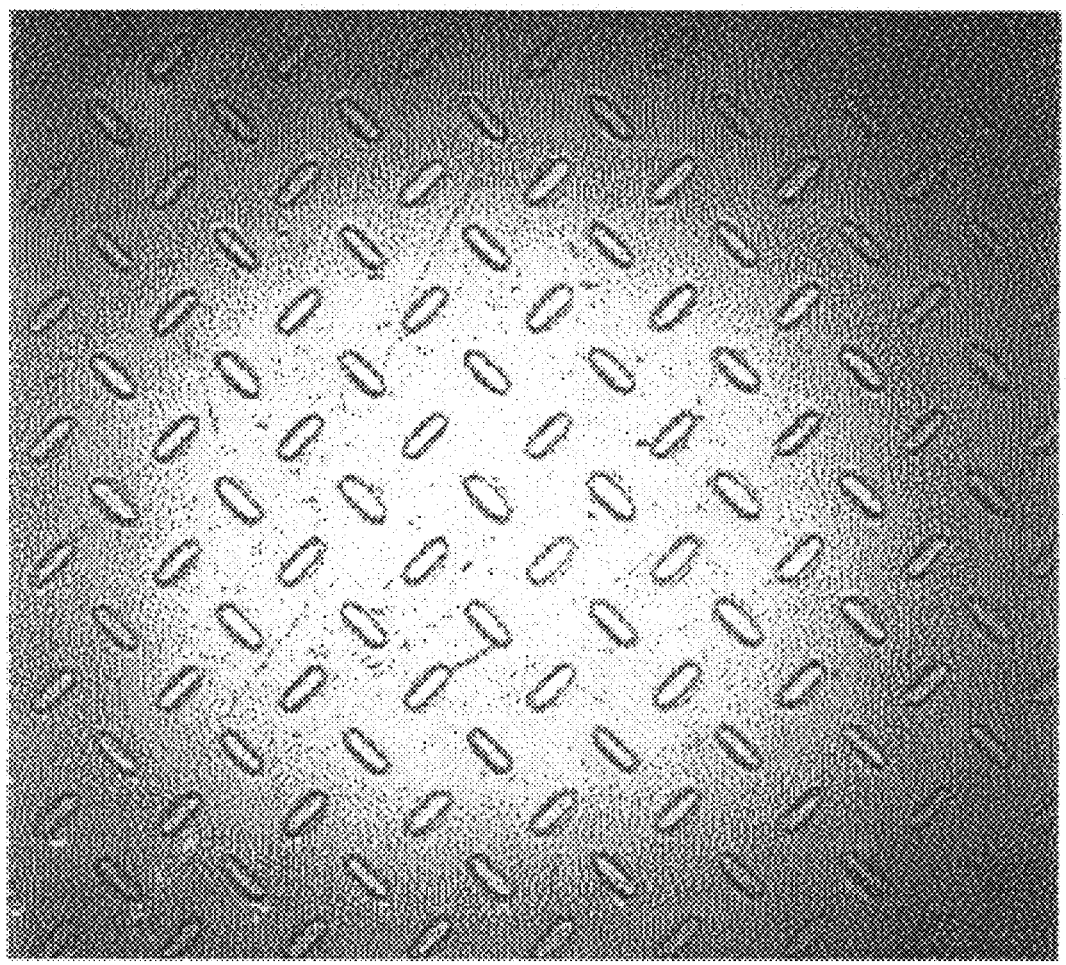
FIG. 1 is an enlarged photograph showing a polymeric film made in accordance with an embodiment of the invention.

Specific modifications and alternative forms of the invention are shown in the drawings. It should be understood, however, that the invention is not limited to the particular embodiments described, but rather it is the intention to cover modifications, equivalents, and alternatives falling within the spirit and scope of the invention as described by the appended claims.

DETAILED DESCRIPTION OF THE INVENTION

The present invention is directed to an improved polymeric film, and in particular a cloth-like polymeric film. The polymeric film typically includes at least one polymeric layer having a plurality of perforations. These perforations are arranged in a fashion such that they promote easy tearing of the film in the machine direction (MD) and transverse direction (TD). The perforations sufficiently preserve the tensile strength of the film while allowing straight line tearing of the film such that the film is suitable as a tape backing.

The perforations are typically elongate ovals, rectangles, or other non-circular shapes arranged in a fashion such that the major axis of each perforation intersects adjacent perforations or passes near adjacent perforations. This perforated polymeric film can be joined to one or more additional layers or films, such as a top layer to provide durability or impermeability, or a bottom layer to provide adhesiveness.

In reference now to the figures, FIG. 1 is a photograph showing an enlarged portion of a perforated multi-layer film manufactured in accordance with the invention. The film shown in FIG. 1 includes numerous perforations, each of which is generally oval shaped and has a length of approximately 60 mils (1.5 mm) and a width of 20 mils (0.5 mm). As will be discussed below, additional alternative perforation patterns and sizes can be used.

Figure 2:
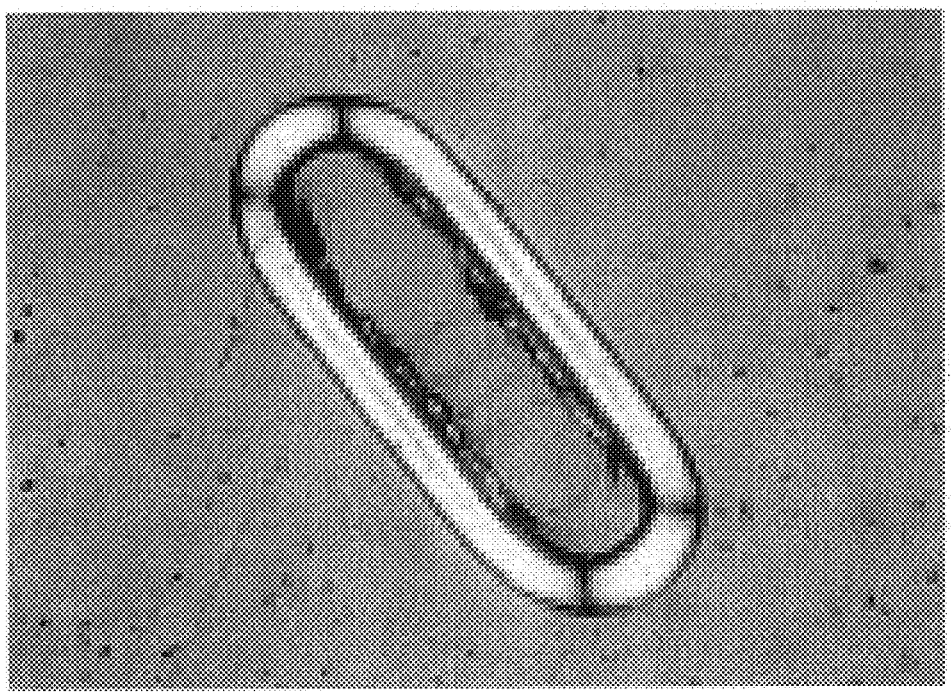
FIG. 2 is an enlarged photograph showing a single perforation of a perforated polymeric film in accordance with an implementation of the invention.

FIG. 2 shows an enlarged photograph of an individual perforation produced in an oriented film in accordance with the invention. The perforation is non-circular and has a length significantly greater than its width. A light colored area around the perimeter of the perforation reveals a raised ridge formed during perforation by a heat source. This raised ridge consists of polymer material from the interior of the perforation that has contracted upon heating and release of its orientation energy. In specific implementations this ridge has been observed to provide enhanced tear properties of the perforated film. The raised ridge can also impart slight textures that cause the film to more closely resemble a cloth material.

Figure 3:
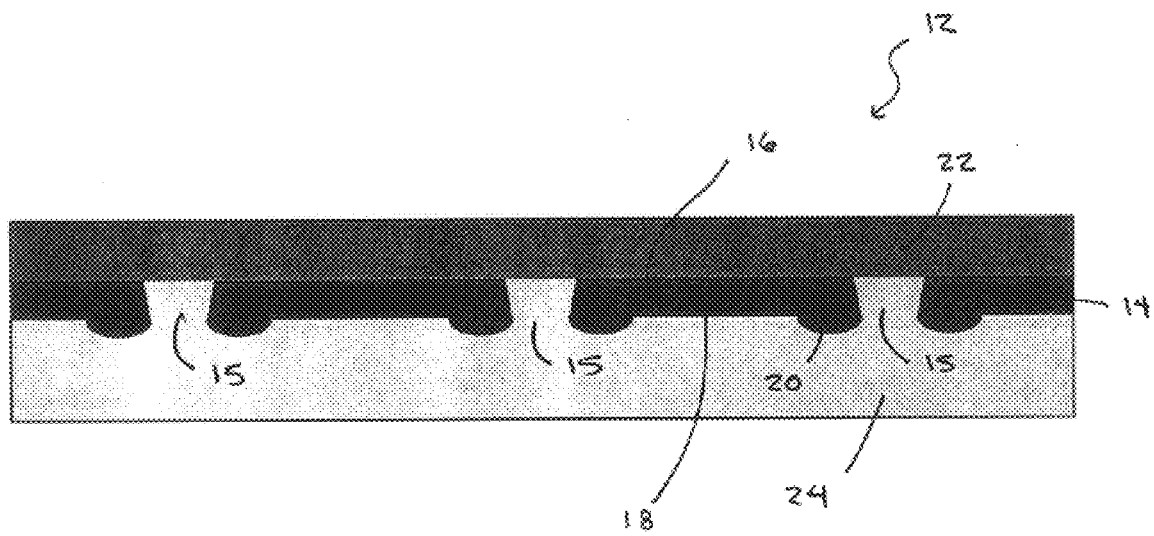
FIG. 3 is a cross-sectional representation of a multilayer polymeric film made in accordance with an embodiment of the invention.

In reference now to FIG. 3, a representation is shown of a cross section of a composite polymeric tape 12 produced in accordance with the invention using a perforated film as a tape backing material. Polymeric tape 12 contains a perforated film 14 having first major surface 16 and second major surface 18. Perforated film 14 contains perforations 15 extending through its thickness. In the embodiment depicted, the edges of each perforation 15 along second major surface 18 include raised portions 20. Perforated film 14 is typically an oriented film, more preferably a biaxially oriented film.

Polymeric tape 12 further includes a top film 22 and a bottom film 24. In the embodiment shown, top film 22 provides durability to the polymeric tape 12, and can further increase the strength and impart fluid impermeability to tape 12. Bottom film 24 is, for example, an adhesive composition. Additional or alternative layers can be used to create tape 12. The arrangement of the layers can also be changed. Thus, for example, the adhesive can be applied directly to the top film 22 rather than to the perforated layer.

The various materials and methods used for making perforated polymeric films in accordance with the invention will now be discussed in greater detail.

A. Perforation Patterns

Figure 4:
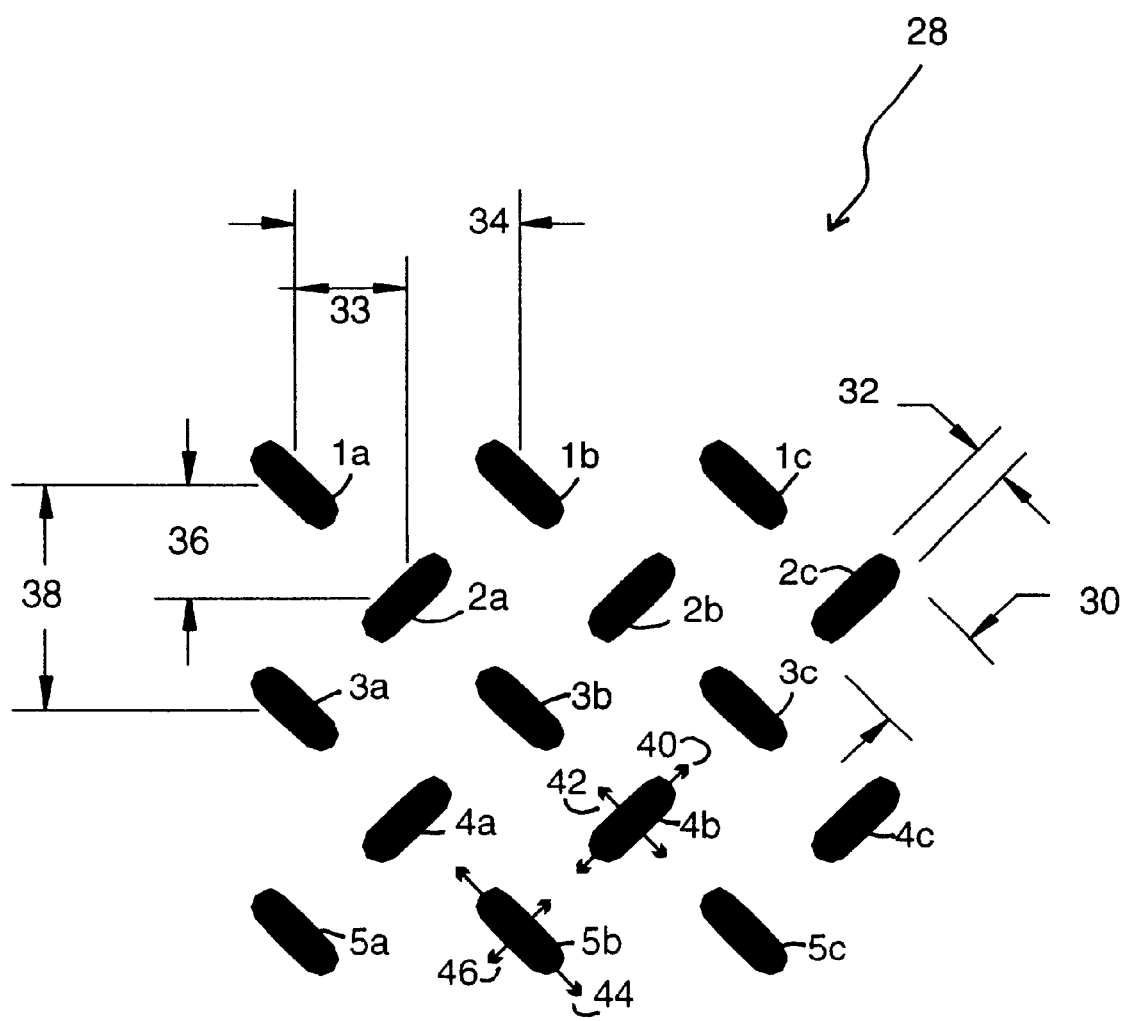
FIG. 4 is a top plan view of a pattern of perforations in a polymeric film made in accordance with an implementation of the invention.
Figure 5A:
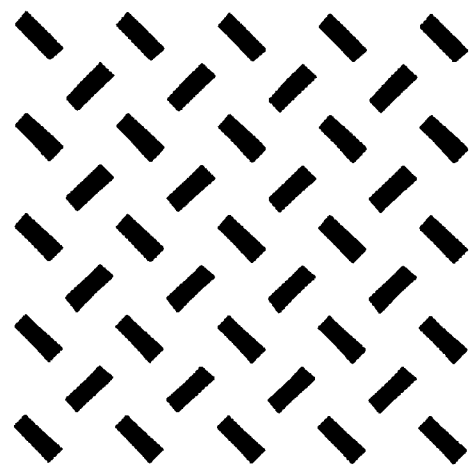
FIGS. 5A through 5D show top plan views of four patterns for perforated polymeric film made in accordance with an embodiment of the invention.
Figure 5B:
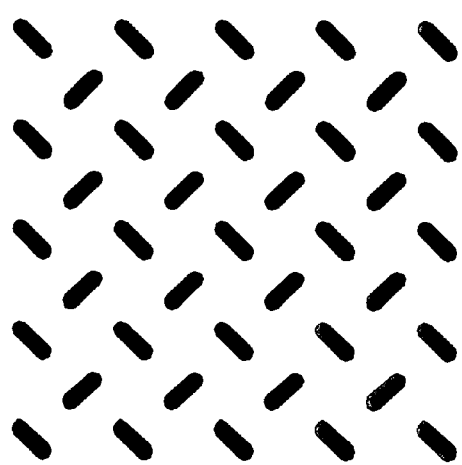
Figure 5C:
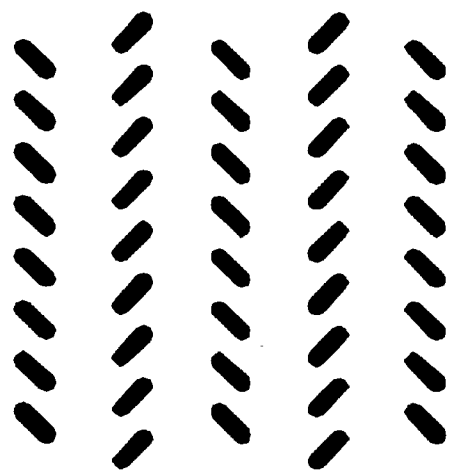
Figure 5D:
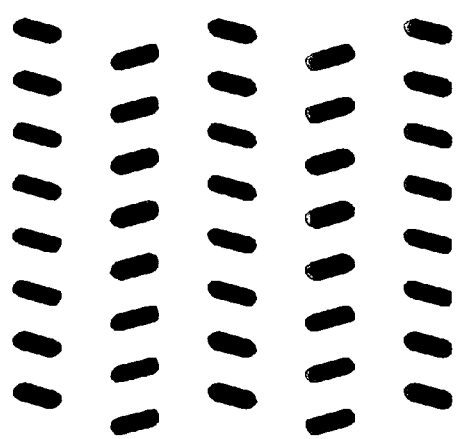

The perforation pattern formed in polymeric film 14 has a strong influence on the tear and tensile properties of the cloth-like films and tape backings of the invention. In reference now to FIG. 4, a portion of an enlarged layout of a typical perforation pattern 28 is shown, with the machine direction oriented up and down, and the transverse direction oriented left to right. Depicted perforation pattern 28 comprises a series of rows of perforations, identified as a first row having perforations 1a, 1b, and 1c; a second row having perforations 2a, 2b, and 2c; a third row having perforations 3a, 3b, and 3c; a fourth row having perforations 4a, 4b, and 4c; and a fifth row having perorations 5a, 5b, and 5c. Typically the perforations form a pattern extending along most or all of the surface of a film, and thus the pattern shown in FIG. 4 is just a portion of one such pattern.

The perforation pattern depicted in FIG. 4 can be described by reference to various parameters, including the absolute dimensions and orientations of each perforation, plus the placement of the perforations with respect to one another. These parameters specifically include the shape of each perforation, the length 30 and width 32 of each perforation, the transverse direction distance 33 between the centers of perforations on adjacent columns, the transverse direction 34 between the centers of adjacent perforations on alternate columns; the machine direction distance 36 between the centers of perforations on adjacent rows, and the machine direction distance 38 between the centers of adjacent perforations on alternate rows.

The length 30 of suitable perforations is the longest dimension of each perforation, and can vary depending upon the intended application. Perforations typically have a length 30 of less than 200 mils (5.08 mm), more typically less than 100 mils (2.54 mm), and even more typically less than 50 mils (1.27 mm). In a first specific implementation, the perforations have a length of approximately 60 mils (1.52 mm). In a second specific implementation, the perforations have a length of approximately 30 mils (1.26 mm). Perforations typically have a width 32 of less than 100 mils (2.54 mm), more typically less than 50 mils (1.27 mm), and even more typically less than 25 mils (0.64 mm). In a first implementation of the invention the perforations have a width of 20 mils (0.51 mm), and in a second implementation the perforations have a width of 10 mils (0.25 mm).

The perforations of typical films are all of one size or a few distinct sizes. It will be appreciated that the perforations typically show some normal variation in size as a result of the manufacturing processes, the materials used, and their small scale. In addition, specific implementations can be made in which the perforations have non-uniform sizes. Also, the width and length of the perforations are usually related such that the length is more than 1.5 times the width, and even more typically from 2.5 to 3.5 times the width. In specific embodiments, the length is greater than 3 times the width.

The individual perforations in a specific row typically have a transverse direction distance 34, measured from the center of each perforation, of less than 300 mils (7.62 mm), and more typically less than 150 mils (3.81 mm). In a first specific implementation, the transverse direction distance 34 is approximately 125 mils (3.18 mm). In a second specific implementation, the transverse direction distance is approximately 63 mils (1.59 mm). The machine direction distance 38 between alternating rows is typically the same distance as the transverse direction distance 34, but need not be. The machine direction distance 36 between adjacent perforations is typically less than 150 mils (3.81 mm), and more typically less than 75 mils (1.91 mm). In a first implementation, the machine direction distance 38 between adjacent perforations is 63 mils (1.59 mm), and in a second implementation the machine direction distance between adjacent rows 36 is approximately 31 mils (0.79 mm). The transverse direction distance 33 between adjacent perforations is typically the same distance as the machine direction distance 36, but need not be.

Typically, the perforations in adjacent rows of perforations (such as the first and second row, or the second and third row) are oriented at opposed angles. Thus, in reference to the rows of perforations shown in FIG. 4, perforations in the first row (comprising perforations 1a, 1b, and 1c) are oriented at 90 degrees relative to the perforations in the second row (comprising perforations 2a, 2b, and 2c). In typical implementations the perforations in these alternate rows are oriented at from 40 to 140 degrees to one another, and more typically from 60 to 120 degrees, and even more typically from 75 to 105 degrees.

Each perforation typically has a major axis and a minor axis. The major axis is oriented to extend the length of the perforation through the two ends of the perforation, while the minor axis extends perpendicular to the major axis through the interior of the perforation, typically half way between the ends. For illustrative purposes, two perforations in FIG. 4 are shown with major and minor axes marked. Specifically, perforation 4b shows major axis 40 and minor axis 42, and perforation 5b shows major axis 44 and minor axis 46. It will be appreciated that the other perforations also have major and minor axes, but they have not been specifically identified.

In the embodiment shown, the perforations are arranged such that an extension of the major axis of each perforation passes through an adjacent perforation which lies on both an adjacent row and an adjacent column. An extension of the major axis of each perforation preferably passes as closely as possible through the center, or, in other words, through the point of intersection of the major and minor axes, of an adjacent perforation. However, in certain implementations the perforations are arranged such that they extend close to, but not through, adjacent perforations.

Viewing such a pattern along the MD or TD reveals rows and columns of perforations, oriented at angles of 45 degrees to the MD and TD, as shown in FIG. 4. Each such row or column comprises perforations only of the same orientation. When such a film or tape is torn by hand along either the MD or TD, the tear tends to propagate from oval to oval along just one of these lines, with little tendency to "jump" from the line upon which the tear was initiated to an adjacent line. Further, hand-tear at an angle of 45 degrees to the MD or TD is very difficult, as the tear propagates with much more difficulty along a line of ovals alternating between major-axis orientation and minor-axis orientation.

Thus, the films and tapes of the invention advantageously tear in straight lines. As used herein, straight line tearing refers to the property of propagating a tear along a piece of film in a substantially straight manner, such as is normally observed with cloth-backed tapes, including duct tape. Such tears are not usually perfectly linear, but have a substantially straight direction. In addition, a torn film produced in accordance with the invention can still exhibit occasional deviations from a straight line. Films produced in accordance with the invention typically exhibit improved straight line tearing relative to non-perforated film. In addition, the films of the invention typically exhibit improved straight line tearing compared to other perforated films.

Specifically, patterns closely resembling that shown in FIGS. 5A to 5D provide a unique combination of high tensile strength, low elongation to break, easy initiation of tear along both the machine direction (MD) and transverse direction (TD) of the film or tape, macroscopically straight-line tearability along both the MD and TD of the film or tape, and tear propagation forces in the same range as those for woven cloths typically used as adhesive tape backings. The patterns typically comprise elliptical or oval perforations arranged on a grid with their centers lying upon the points of intersection of straight lines, at least one of which is placed at an angle of about 0 degrees (TD) or 90 degrees (MD). Grid line angles of 0 and 90 degrees to the MD are preferred. Equal spacing of the grid lines in both the MD and TD is particularly preferred. For this particularly preferred configuration, additional straight lines passing through the center points of perforations can be drawn at angles of 45 degrees to the MD and TD. For this particularly preferred configuration, the ovals or ellipses are oriented so as to have their major and minor axes lying along these additional lines at 45 degree angles to said straight lines of said grid. Tracing along each of these additional 45 degree lines, the ovals or ellipses alternate orientation between major-axis orientation along the 45 degree line and minor-axis orientation along the 45 degree line. Such a most preferred configuration provides an optimal combination of hand tearability along the MD, hand tearability along the TD, and resistance to tear in directions intermediate to MD and TD, particularly in the 45 degree directions half-way intermediate to MD and TD.

The tear and tensile properties of the films and tapes of this invention will be affected both by the properties of the film which is perforated and the pattern of the perforations. In the case where the film before perforation is a biaxially oriented film having very nearly balanced tear and tensile properties in the MD and TD, the perforation pattern will determine the balance between MD and TD properties in the perforated film. Thus, the preferred pattern shown in FIG. 4, with complete symmetry of MD and TD, will result in balanced tear and tensile properties in the MD and TD. Patterns such as those shown in FIGS. 5C and 5D will result in perforated films which, while having desired properties in both the MD and TD, will be easier to tear and/or higher in tensile strength and/or higher in elongation to break in one principal direction or the other. Patterns such as those shown in FIGS. 5C and 5D may be rotated 90 degrees in order to reverse the effects on the principal directions. Thus, one skilled in the art may design a composite film or adhesive tape of the current invention which meets specified requirements simply by modifying the perforation pattern. Additional degrees of freedom are provided by the possibility of employing a biaxially oriented film which, prior to perforation, has differences in physical properties between MD and TD.

Without wishing to be bound by any theory, it is believed that the density of the perforation pattern contributes to both the cloth-like conformability of the films and tapes of this invention and the tear and tensile properties, and that lowering the perforation density or changing its distribution in such a way as to provide channels, along either the MD (as in FIGS. 5C and 5D) or the TD or both, in which a propagating tear might encounter no perforations, results in decreased conformability, and less desirable tear and tensile properties along the direction of such a perforation-free channel, compared to the most preferred pattern of FIG. 4.

Further, it is believed that a perforation pattern in which the perforations in rows and columns possess the same or similar angular orientation promotes the propagation of a tear along the rows and columns, and that, furthermore, the presence of perforations at different angular orientation in adjacent rows and columns hampers the propagation of tears along directions other than the principal directions.

Also, it is believed that the raised portion, or bead, around each perforation, serves to blunt propagation of the tear, resulting in better control of the tear by hand, an increase in tear propagation force (relative to that of unperforated film) to a level more appropriate to a woven cloth, and the provision of a cloth-ripping sound as the tear passes through the rim-beaded perforations one by one. The tear initiation force, however, is reduced, relative to that of unperforated film, especially for the most preferred perforation pattern of FIG. 4, because the perforation density guarantees that the edge of any film or tape so constructed will have perforations either at or extremely near the edge. Therefore, for the purposes of tear initiation, the inventive films and tapes behave similarly to notched films.

B. Materials

Films made in accordance with the invention are partially or completely formed of polymeric materials, including thermoplastic compositions. The perforated film is typically a thermoplastic, especially a polyolefin, including polypropylene in specific embodiments. Other polymers may be advantageously employed, especially those polymers which are commonly used for making biaxially oriented films, such as polyethylene terephthalate and other polyesters. For the purposes of the present invention, the term "polypropylene" is meant to include copolymers comprising at least about 90% propylene monomer units by weight. "Polypropylene" is also meant to include polymer mixtures comprising at least about 75% polypropylene, by weight.

The polypropylene is preferably predominantly isotactic, and thus has a chain isotacticity index of at least about 80%, an n-heptane soluble content of less than about 15% by weight, and a density between about 0.86 and 0.92 grams/cm$^3$ measured according to ASTM D1505-96 ("Density of Plastics by the Density-Gradient Technique"). Suitable additional polymers in such mixtures include, but are not limited to, propylene copolymers, polyethylenes, polyolefins comprising monomers having from four to eight carbon atoms, and other polypropylene resins.

Typical polypropylenes for use in the present invention have a melt flow index between about 0.1 and 15 grams/ten minutes according to ASTM D1238-95 ("Flow Rates of Thermoplastics by Extrusion Plastometer") at a temperature of 230° C. and force of 21.6 N, a weight-average molecular weight between about 100,000 and 400,000, and a polydispersity index between about 2 and 15. Typical polypropylenes for use in the present invention have a melting point of greater than about 130° C., preferably greater than about 140° C., and most preferably greater than about 150° C., as determined using differential scanning calorimetry.

Further, the polypropylenes useful in this invention may be copolymers, terpolymers, quaterpolymers, etc., having ethylene monomer units and/or alpha-olefin monomer units with 4–8 carbon atoms. Other suitable co-monomers include, but are not limited to, 1-decene, 1-dodecene, vinylcyclohexene, styrene, allylbenzene, cyclopentene, norbornene, and 5-methylnorbornene. Said co-monomer(s) may be present in an amount so as not to adversely affect the desired properties and characteristics of the films, and tapes described herein, typically their content being less than 10 percent by weight. One suitable polypropylene resin is an isotactic polypropylene homopolymer resin having a melt flow index of 2.5 g/10 minutes, commercially available under the product designation 3374 from FINA Oil and Chemical Co., Dallas, Tex.

The polypropylene may be intentionally partially degraded during processing by addition of organic peroxides such as dialkyl peroxides having alkyl groups with up to six carbon atoms, 2,5-dimethyl-2,5-di(tert-butylperoxy)hexane, and di-tert-butyl peroxide. A degradation factor between about 2 and 15 is suitable. Recycled or reprocessed polypropylene in the form of scrap film or edge trimmings, for example, may also be incorporated into the polypropylene in amounts less than about 60% by weight.

Polypropylene for use in the present invention may optionally include, in an amount so as not to adversely affect the desired characteristics and properties described herein, typically between 1 and 40% by weight of a resin, of synthetic or natural origin, having a molecular weight between about 300 and 8000, and having a softening point between about 60° C. and 180° C. Such resin can be chosen from petroleum resins, styrene resins, cyclopentadiene resins, and terpene resins. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constituents, pinene, alpha-pinene, dipentene, limonene, myrcene, and camphene. These resins may be partially or fully hydrogenated.

Top film 22 comprises a thermoplastic, and can be chosen in view of particular adhesive tape applications. In one embodiment, the polymeric tape will be a duct tape, and the top film 22 will be a polyolefin, preferably a polyethylene, more preferably a low density polyethylene. In another embodiment, the polymeric tape will be a breathable tape, such as a medical tape, and the top film 22 will be a permeable polymer such as a polyurethane. In yet another embodiment, the polymeric tape will be a non-curling, dimensionally-stable tape, and the top film 22 will be a polypropylene film with coefficients of thermal expansion in each of the principal in-plane directions substantially identical to those of the perforated film 14.

The adhesive coated as bottom film 24 onto the second major surface 18 of perforated film layer 14 may be any suitable adhesive as is known in the art. Preferred adhesives are those activatable by pressure, heat or combinations thereof. Suitable adhesives include those based on acrylate, rubber resin, epoxies, urethanes or combinations thereof. The adhesive may be applied by solution, water-based or hot-melt coating methods. The adhesive can include hot melt-coated formulations, transfer-coated formulations, solvent-coated formulations, and latex formulations, as well as laminating, thermally-activated, and water-activated adhesives. Useful adhesives according to the present invention include pressure sensitive adhesives. Pressure sensitive adhesives are well known to possess aggressive and permanent tack, adherence with no more than finger pressure, and sufficient ability to hold onto an adherend.

Various adhesives can be used to form bottom film 24, and include those based on general compositions of polyacrylate; polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene- containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above.

Additionally, the adhesives can contain additives such as tackifiers, plasticizers, fillers, antioxidants, stabilizers, pigments, diffusing materials, curatives, fibers, filaments, and solvents. Also, the adhesive optionally can be cured by any known method. The adhesive may be applied in any desired amount, and typically is applied to provide a conventional dry coating weight between about 0.0015 to 0.005 grams/cm$^2$.

A general description of useful pressure sensitive adhesives may be found in the Encyclopedia of Polymer Science and Engineering, Vol. 13, Wiley-Interscience Publishers (New York, 1988). Additional description of useful pressure sensitive adhesives may be found in Encyclopedia of Polymer Science and Technology, Vol. 1, Interscience Publishers (New York, 1964).

Films of the present invention may optionally include, in either the perforated film layer 14, the top film 22 or any intervening layer, additives and other components as is known in the art. For example, the films and tapes of the present invention may contain fillers, pigments and other colorants, antiblocking agents, lubricants, plasticizers, processing aids, antistatic agents, nucleating agents, antioxidants and heat stabilizing agents, ultraviolet-light stabilizing agents, and other property modifiers. Fillers and other additives are preferably added in an amount selected so as not to adversely affect the properties attained by the preferred embodiments described herein.

Organic fillers may include organic dyes and resins, as well as organic fibers such as nylon and polyimide fibers, and inclusions of other, optionally crosslinked, polymers such as polyethylene, polyesters, polycarbonates, polystyrenes, polyamides, halogenated polymers, polymethyl methacrylate, cyclo-olefin polymers, and the like.

Inorganic fillers may include pigments, fumed silica and other forms of silicon dioxide, silicates such as aluminum silicate or magnesium silicate, kaolin, talc, sodium aluminum silicate, potassium aluminum silicate, calcium carbonate, magnesium carbonate, diatomaceous earth, gypsum, aluminum sulfate, barium sulfate, calcium phosphate, aluminum oxide, titanium dioxide, magnesium oxide, iron oxides, carbon fibers, carbon black, graphite, glass beads, glass bubbles, mineral fibers, clay particles, metal particles, and the like.

In some applications it may be advantageous for voids to form around the filler particles during an orientation process. Organic and inorganic fillers may also be used effectively as antiblocking agents. Alternatively, or in addition, lubricants such as polydimethyl siloxane oils, metal soaps, waxes, higher aliphatic esters, and higher aliphatic acid amides (such as erucamide, oleamide, stearamide, and behenamide) may be employed.

The film may contain antistatic agents, including aliphatic tertiary amines, glycerol monostearates, alkali metal alkanesulfonates, ethoxylated or propoxylated polydiorganosiloxanes, polyethylene glycol esters, polyethylene glycol ethers, fatty acid esters, ethanol amides, mono- and diglycerides, and ethoxylated fatty amines. Organic or inorganic nucleating agents may also be incorporated, such as dibenzylsorbitol or its derivatives, quinacridone and its derivatives, metal salts of benzoic acid such as sodium benzoate, sodium bis(4-tert-butyl-phenyl)phosphate, silica, talc, and bentonite.

Antioxidants and heat stabilizers can further be incorporated, including phenolic types (such as pentaerythrityl tetrakis [3-(3,5-di-tert-butyl-4-hydroxyphenyl) propionate] and 1,3,5-trimethyl-2,4,6-tris(3,5-di-tert-butyl-4-hydroxybenzyl)benzene), and alkali and alkaline earth metal stearates and carbonates. Other additives such as flame retardants, ultraviolet-light stabilizers, compatibilizers, antimicrobial agents (e.g., zinc oxide), electrical conductors, and thermal conductors (e.g., aluminum oxide, boron nitride, aluminum nitride, and nickel particles) may also be blended into the polymers used to form the film or tape backing.

The perforated film layer 14 of tape 12 may be optionally treated on either or both major surfaces 16 and 18 by exposure to flame or corona discharge or other surface treatments, including chemical priming, to improve adhesion of subsequent coating layers. In addition, the exposed surface of top film 22 may be coated with optional low adhesion backsize materials to restrict adhesion between the opposite surface adhesive layer and the top film 22, thereby allowing for production of adhesive tape rolls capable of easy unwinding, as is well known in the adhesive coated tape-making art.

The films of this invention, when used as a backing for a tape, preferably have a final thickness between about 0.8 mils to 6 mils (0.020 mm to 0.152 mm). Thicker and thinner films may be used, with the understanding that the film should be thick enough to avoid excessive flimsiness and difficulty in handling, while not being so thick so as to be undesirably rigid or stiff and difficult to handle or use. Variability in film thickness, as measured by the standard deviation relative to the average, is preferably less than 10% down the web and across the interior width of the film excluding its edge areas.

The details of converting film backings into tapes are known. See, for example, U.S. Pat. No. 4,451,533, "Dispensable Polypropylene Adhesive-Coated Tape," (Wong et al), the entire disclosure of which is incorporated herein by reference.

The films described herein are suited for many adhesive tape backing applications. The presence of the top film 22 over the perforation pattern can provide an appearance similar to a poly-coated cloth-based tape backing in certain implementations. This appearance, combined with the tensile and tear properties, makes the film useful as a backing for duct tape, gaffer's tape, or the like. Particularly for duct tape, incorporation of known appropriate pigments for a silver-gray coloration into the top film contributes to a familiar appearance, which is desired in the marketplace. Because the backing is conformable, it is also useful as a masking tape backing.

C. Perforated Film Production Methods

The perforated film of the present invention can be manufactured using various film forming, orientation, and perforation techniques.

In one implementation, the film is initially cast into sheet form to prepare a sheet suitable for stretching to make an oriented film. When making polypropylene films, one suitable method for casting a sheet is to feed the resin into a feed hopper of a single screw, twin screw, cascade, or other extruder system having an extruder barrel temperature adjusted to produce a stable homogeneous melt. The polypropylene melt can be extruded through a sheet die onto a rotating cooled metal casting wheel. Optionally, the casting wheel can be partially immersed in a fluid-filled cooling bath, or, also optionally, the cast sheet can be passed through a fluid-filled cooling bath after removal from the casting wheel.

After formation, the sheet is stretched to provide an oriented film. Various methods or apparatuses for stretching the film can be used. A first method includes use of a sequential biaxial stretching apparatus that typically first stretches in the machine direction by passing the film over a sequence of rotating rollers whose speed provides a higher output film line speed than input speed, followed by transverse direction stretching in a tenter on diverging rails. Alternative methods include use of simultaneous biaxial stretching by a mechanical tenter such as the apparatus disclosed in U.S. Pat. Nos. 4,330,499 and 4,595,738; and use of the tenter apparatus for simultaneous biaxial stretch disclosed in U.S. Pat. Nos. 4,675,582; 4,825,111; 4,853,602; 5,036,262; 5,051,225; and 5,072,493 (all incorporated by reference). Biaxially stretched films can also be made by blown film, double-bubble, and tubular film techniques.

Again regarding polypropylene, in one sequential stretch embodiment, the machine direction stretch ratio is from about 4:1 to 6:1. More preferably, the machine direction stretch ratio is about 4.5:1 to about 5.5:1. In another preferred sequential stretch embodiment, the transverse direction stretch ratio is at least 7:1. More preferably, the transverse direction stretch ratio is from about 7:1 to about 12:1. In another preferred sequential stretch embodiment, the machine direction stretch ratio is from about 4:1 to about 6:1 and the transverse direction stretch ratio is at least 7:1. More preferably, the machine direction stretch ratio is from about 4.5:1 to about 5.5:1 and the transverse direction stretch ratio is from about 7:1 to about 11:1. One preferred backing is one that is sequentially biaxially stretched having a machine direction stretch ratio of about 5:1 and a transverse direction stretch ratio of about 8:1 to 10:1.

In one simultaneous biaxial stretch embodiment, the area stretch ratio is from about 35:1 to about 108:1. More preferably, the area stretch ratio is from about 45:1 to about 60:1. The machine direction component and transverse direction component of these embodiments is chosen so as to provide the desired film properties and characteristics described herein.

The temperatures of the stretching operation can be chosen to provide a film having the desired characteristics and properties. These temperatures will vary with the material used, and with the heat transfer characteristics of the particular apparatus used. For one implementation utilizing polypropylene, the preheat roll and the stretch roll for the machine direction stretch are maintained at about 120–135° C. For the transverse direction stretch in the tenter, the preheat zone is typically maintained at about 180–190° C., and the stretch zone is maintained at about 160–180° C. For simultaneously stretched backings, the preheat and stretch temperatures are usually from approximately 160° C. to 215° C.

Perforation of the film used to prepare perforated film layer 14 may be done by a variety of techniques. It is preferred that the perforation technique used result in perforations that lack sharp edges. It is also preferred that the perforation technique used result in the formation of raised portions 20 at the edges of the perforations, and that said raised portions 20 form as a result of highly localized melting of the film being perforated in isolated spots.

It is not necessary for each of the perforations to be wholly identical to the others or absolutely precise in shape, size, or openness. Many perforation techniques known in the art, including most thermal techniques, create perforations that vary somewhat in size and perfection of shape, and this does not have a significant deleterious effect on the current invention. Similarly, perforations can be less than entirely open without deleterious effect. Thus, an elliptical-shaped perforation can have "streamers" of the polymeric material spanning the perforation, in effect turning what was intended to be one elliptical perforation into two or more closely grouped irregularly shaped and sized perforations having, collectively, an elliptical outer boundary. Likewise, an elliptical perforation can be intentionally simulated by a series of closely grouped smaller perforations of circular or other shape. Such variations have minimal or no deleterious effect on the advantageous properties of the present invention and are anticipated by it.

Similarly, not all perforations in film 14 need to completely penetrate through both film surfaces 16 and 18, provided that a significant portion of the perforations do. Thus, some locations in the perforation pattern may instead be the sites of depressions or pits which do not fully penetrate both film surfaces, without deleterious effect on the desired tear and tensile properties of the film.

Perforation techniques usable in making the perforated film 14 in the present invention include perforation by impingement of a hot fluid, especially a hot gas, as disclosed in U.S. Pat. No. 3,038,198 and United Kingdom Patents Nos. 851,053, 851,473, 1,073,605, and 2,313,338; perforation by impingement of a flame, as disclosed in U.S. Pat. No. 3,394,211 and U. K. Patents Nos. 1,012,963; 1,073,605, and 2,313,338; perforation by fusion-slitting with heated blades, as disclosed in U.S. Pat. No. 3,985,600; perforation by embossing followed by opening of the ends of the protrusions by heating, as disclosed in U.S. Pat. No. 4,248,822; perforation by thermally embossing with an embossing roll having protruding knobs while simultaneously taking up the film at a rate not less than the speed of the embossing roll, as disclosed in U.S. Pat. No. 4,978,486; perforation by puncture with hot needles; perforation using ultrasonic waves; perforation using infrared energy in place of heated gas or flame; and perforation by energy impingement, such as by laser, electron beam, or corona discharge.

A specific method for perforating the film layer 14 is the use of a Sherman Treater Gas Flame Film Perforator (Sherman Treaters, Ltd., Thame, Oxon, U. K.). Perforation with the Sherman Treater is applicable to biaxially oriented polypropylene film, and provides a raised, or beaded, edge on the perforations at the surface of the perforated film 14 which faced the flames during the treatment. A further advantage of this method for perforation is that it leaves the surface of the perforated film 14 which bears the raised portions 20 flame-primed for adhesion to subsequently applied layers, such as adhesive, without need of an additional priming step.

The top film 22 may be affixed to the perforated film 14 by a variety of techniques, including affixing a pre-formed top film 22 to the perforated film 14 by lamination. Adhesive, thermal, or other lamination methods known in the art may be used. Alternatively, the top film 22 may be coated upon the perforated film 14. Various coating methods known in the art may be used, including solvent-based coating methods and extrusion coating. In addition, top film 22 may be affixed to perforated film 14 by coextrusion of the two layers prior to the perforation step in the process, provided said perforation step is performed in such a way as to substantially perforate layer 14 while leaving top film 22 substantially unpenetrated.

In a first implementation, top film 22 is affixed to the perforated film 14 by thermal lamination to a pre-primed perforated film 14. Perforated film 14 may be pre-primed by any technique known in the art, including but not limited to flame treatment, corona treatment, plasma treatment, electron beam, ultraviolet, and chemical treatments.

Alternatively, the perforated film 14 may be prepared as a dual-layer film, with the second layer being a priming polymer layer. When top film 22 comprises LDPE, and perforated film 14 comprises biaxially oriented polypropylene, a preferred method is to prepare perforated film 14 as a dual-layer film, the second layer comprising a polyethylene, preferably low density polyethylene or linear low density polyethylene. The polyethylene layer comprises preferably 1–10% of the total thickness of the perforated film 14, more preferably 2–5% of the total thickness. This polyethylene layer serves as a priming polymer layer for thermal lamination to the top film 22. When this method is used, a particularly preferred top film 22 is a low density polyethylene blown film.

The top film 22 may also comprise a multilayer film. In one particular embodiment, top film 22 comprises a polyethylene three-layer film wherein the central layer includes a blocker or absorber for ultraviolet (UV) light. Use of such a top film 22 provides extended life to the cloth-like film or adhesive tape when exposed to UV radiation, as in an outdoor application. The performance over time of the adhesive in an adhesive tape may be particularly enhanced in this embodiment, as many adhesives are particularly subject to UV degradation.

The surface of perforated film 14 which bears the raised portions 20 is not limited. Thus, in the dual-layer perforated film exemplified above, raised portions 20 may be on the biaxially oriented polypropylene surface or on the polyethylene surface. Raised portions 20 are preferably on the biaxially oriented polypropylene surface. Likewise, the orientation of the surface having the raised portions in the completed adhesive tape or cloth-like film construction is not limited. Top film 22 may be affixed to either the raised surface of perforated film 14, or to the non-raised surface.

In another alternative processing method, the top film 22 may be affixed to the layer which will become perforated film 14 prior to the perforation step. Perforation may then be performed by techniques mentioned above in such a way that the perforations extend through the perforated film 14, and, optionally, into but not completely through top film 22.

Subsequent to formation of the tape by the methods disclosed herein, an additional optional processing step comprising a small amount of additional stretching, either uniaxial or biaxial, results in increased "bulk" or "loft", further reduces elongation to break, and provides an even more marked cloth-like appearance or "look" than that possessed by the film or tape backing of the invention lacking said additional optional processing. For optimal loft, uniaxial orientation is preferred.

D. EXAMPLES

The operation of the present invention will be further described with regard to the following examples. These examples are offered to further illustrate the various specific and preferred embodiments and techniques. It should be understood, however, that many variations and modifications may be made while remaining within the scope of the present invention.

Film/Tape Tensile Property Determinations

The machine direction (MD) and transverse direction (TD) tensile strength (at break) and elongation to break were measured according to the procedures described in ASTM D-882, "Tensile Properties of Thin Plastic Sheeting," Method A. The films were conditioned for 24 hours at 22° C. (72° F.) and 50 percent relative humidity (RH) prior to testing. The tests were performed using a tensile testing machine commercially available as a Model No. Sintech 200/S from MTS Systems Corporation, Eden Prairie, Minn. Specimens for this test were 2.54 cm wide and at least 15 cm long. An initial jaw separation of 10.2 cm and an initial crosshead speed of 5.08 cm/min were used. At an elongation of 0.508 cm, the crosshead speed was step-increased to 25.4 cm/min.

Film/Tape Tear Test

The following procedure was used to determine the MD and TD tear properties related to initiation and propagation of tear of the film and tape specimens. A specimen was cut from the film or tape about 5 cm long (in the direction in which it was to be torn) and about 9 cm wide. The ends of the specimen were folded over in the direction of greater size (the width), leaving slightly less than 0.64 cm of single-ply film or tape in the center. In the case of adhesive coated tape, the ends were folded over adhesive-to-adhesive. Thus, stubs of approximately 2 cm width, with the adhesive trapped inside, were created at each end of the single-ply center area. This prevented adhesion of the sample to the jaws of the testing apparatus, and promoted tearing in the desired central location. A standard tensile tester was used, and the specimen was mounted in such a way that the length dimension was horizontal. The specimen was clamped in such a way that only 0.32 cm of each of the stub areas was contacted by the jaws; with the remainder of the sample protruding out to the side and the remainder of the jaws' clamping area being empty. The initial separation of the jaws was 0.64 cm. The jaws were separated at a rate of 127 cm/min. Tear initiated in the central single-ply zone at the end near the clamps, and propagated along the 5.08 cm length of the single-ply zone.

A typical force vs. displacement trace for this test showed a rise in force as the specimen resists tearing, followed by a sudden drop in force upon initiation of the tear. The peak force at this point of tear initiation is the tear initiation force. The displacement at this point, divided by the gauge length, is the elongation to tear initiation. The area below the curve up to this point is the tear initiation energy. For the cloth-based or cloth-like film-based specimens, the force trace upon initiation of tear did not drop to zero but, rather, after some optional initial large fluctuation(s), arrived at a steady level. This level is the tear propagation force. There was usually a small amount of "sawtooth"-like fluctuation at the level of the tear propagation force, due to the perforated nature of the films and tapes of this invention. At the conclusion of the 5.08 cm long tear, the force dropped to zero. The area under the entire test trace is the total tear energy. The tear propagation energy is the difference between the total tear energy and the tear initiation energy.

The operation of the present invention will be further described with regard to the following detailed examples. These examples are offered to further illustrate the various specific and preferred embodiments and techniques. It should be understood, however, that many variations and modifications may be made while remaining within the scope of the present invention.

Example 1

A commercially-available biaxially oriented polypropylene (BOPP) dual-layer film was obtained. The second, or skin, layer was a low density polyethylene. The film had been stretched to stretch ratios in the MD and TD of approximately 5:1 and 9:1, respectively. This film was perforated by feeding the film and a photocopy of a sheet of paper printed with the desired perforation pattern into a 3M™ (St. Paul, Minn.) infrared Transparency Maker, so that the printed side of the paper was faced upon the polyethylene side of the film, and the infrared radiation impinged through the clear film. The infrared radiation was absorbed by the black markings on the sheet of paper, which thus locally heated the dual-layer BOPP, causing melting and retraction of the oriented polymer at those spots, resulting in perforations with raised portions, or "beads" at their boundaries. The perforation pattern was that of the ovals of FIG. 4, with both row-to-row distance 38 and column-to-column distance 34 being 3.18 mm. The perforation length 30 was 1.52 mm and the perforation width 32 was 0.51 mm. The perforations were oriented at 45 degrees to the MD and TD as shown in FIG. 4. The perforated film was subsequently thermally laminated on its polyethylene side to a sheet of polyethylene sandwich-bag film, by pressing the films against a heated steel plate, at about 110° C. The laminated composite film was hand-tearable along straight lines in both the MD and TD.

Example 2

The composite film of Example 1 was further stretched, by hand at room temperature, in the MD. The film showed very little recovery from this additional stretching. The film developed a markedly lofted or textured appearance, closely resembling poly-coated woven cloth.

Examples 3–19

These examples were produced starting from plain (mono-layer) 28 micron thick BOPP of approximate stretch ratios 5:1 and 9:1 in MD and TD, respectively. The infrared perforation technique outlined in Example 1 was once again employed. Various spot patterns were examined, and all were variations on the angled oval pattern described in Example 1. Three different hole shapes were tested: ovals (as in Example 1), rectangles, and three closely-spaced circular holes in a row (approximating an oval). The overall size (length and width) of the features was kept constant within a particular test. The three perforation types were each arrayed in uniform patterns centered on the same square grid as in Example 1, but the perforations were oriented at three different angles to the downweb direction: 30 degrees, 45 degrees (as in Example 1), and 60 degrees. Two pattern sizes were evaluated for all the shapes and angles. The smaller sized pattern was that of Example 1. The larger sized pattern was approximately 50% larger in both perforation size and spacing. The perforated films were not laminated, but were tensile tested as made. Example 3 represents the unperforated film. The unperforated film of Example 3 was not hand tearable. The perforated films of Examples 4–19 were all hand tearable. The tensile results for Examples 3–19 are shown in Table 1.

TABLE 1

| Example No. | Perforation Type | Perforation Orientation Angle (degree) | MD Tensile Strength at Break (kg/cm) | MD Elongation to Break (%) | TD Tensile Strength at Break (kg/cm) | TD Elongation to Break (%) |
|---|---|---|---|---|---|---|
| 3 | None | — | 4.32 | 167.0 | 8.80 | 38.0 |
| 4 | Small Oval | 30 | 1.13 | 30.9 | 1.48 | 5.5 |
| 5 | Small Oval | 45 | 1.16 | 25.0 | 1.84 | 8.5 |
| 6 | Small Oval | 60 | 1.38 | 36.4 | 2.39 | 7.2 |
| 7 | Small Rectangle | 30 | 1.00 | 22.5 | 1.36 | 4.1 |
| 8 | Small Rectangle | 45 | 1.05 | 20.4 | 1.52 | 4.1 |
| 9 | Small Rectangle | 60 | 1.25 | 25.5 | 2.14 | 5.6 |
| 10 | Row of Small Circles | 30 | 1.08 | 24.3 | | |
| 11 | Row of Small Circles | 60 | 1.34 | 32.6 | 2.12 | 5.9 |
| 12 | Large Oval | 30 | 0.95 | 19.6 | | |
| 13 | Large Oval | 45 | 1.07 | 17.8 | | |
| 14 | Large Oval | 60 | 1.27 | 23.0 | | |
| 15 | Large Rectangle | 30 | 0.89 | 13.0 | | |
| 16 | Large Rectangle | 45 | .91 | 11.2 | | |
| 17 | Large Rectangle | 60 | 1.14 | 14.9 | | |
| 18 | Row of Large Circles | 45 | 1.07 | 21.0 | | |
| 19 | Row of Large Circles | 60 | 1.27 | 25.7 | | |

Examples 20–26

These examples were produced starting from plain (mono-layer) 28 micron thick BOPP of approximate stretch ratios 5:1 and 9:1 in MD and TD, respectively. The infrared perforation technique outlined in Example 1 was once again employed. Various pattern densities were examined, using the 45 degree angled oval pattern described in Example 1. Three different void densities were examined, as shown in Table 2. Two pattern sizes were evaluated. The smaller sized pattern was that of Example 1. The larger sized pattern was approximately 50% larger in both perforation size and spacing. The perforated films were not laminated, but were tensile tested as made. Examples 20, 23, and 26 replicate Examples 3, 5, and 13 in Table 1, and are reproduced here in Table 2 for clarity. Example 20 represents the unperforated film. The tensile results for Examples 20–26 are shown in Table 2.

TABLE 2

| Example No. | Oval Size | Perforation Density (No./sq. cm.) | Void Density (% void) | MD Tensile Strength at Break (kg/cm) | MD Elongation to Break (%) |
|---|---|---|---|---|---|
| 20 | None | 0.00 | 0.0 | 4.32 | 167.0 |
| 21 | Small | 0.039 | <0.1 | 2.55 | 74.6 |
| 22 | Small | 4.3 | 3.6 | 1.93 | 51.0 |
| 23 | Small | 16.0 | 13.1 | 1.16 | 25.0 |
| 24 | Large | 0.039 | 0.1 | 3.21 | 108.1 |
| 25 | Large | 2.6 | 3.9 | 1.89 | 49.3 |
| 26 | Large | 9.5 | 14.5 | 1.07 | 17.8 |

Examples 27–30

To examine the effect of the BOPP film thickness on the hand tearability and tensile properties, Experiments 3–6 were repeated, with the exception that 41 micron thick BOPP of otherwise substantially identical properties was employed. Example 27 is the unperforated BOPP, which was not hand tearable. The three perforated films were hand tearable. The tensile test results are shown in Table 3.

TABLE 3

| Example No. | Perforation Type | Perforation Orientation Angle (degree) | MD Tensile Strength at Break (kg/cm) | MD Elongation to Break (%) | TD Tensile Strength at Break (kg/cm) | TD Elongation to Break (%) |
|---|---|---|---|---|---|---|
| 27 | None | — | 5.64 | 181.1 | 10.2 | 36.7 |
| 28 | Small Oval | 30 | 1.29 | 19.0 | 1.57 | 8.2 |
| 29 | Small Oval | 45 | 1.39 | 19.3 | 2.05 | 8.3 |
| 30 | Small Oval | 60 | 1.64 | 21.5 | 2.70 | 8.5 |

Examples 31–37

Five specimens of commercially available adhesive tapes made with woven cloth backings were obtained and tested for their tear properties in both the MD and TD. The Film/Tape Tear Test described above was used to obtain quantitative data. The five commercially available tapes are TYCOT™ 975 (Example 31), Nashua™ 357 Premium (Example 32), Manco™ Duck™ All Purpose (Example 33), Manco™ Duck™ Industrial (Example 34), and, Manco™ Duck™ Professional (Example 35).

In addition, two tapes of the present invention were manufactured for Examples 36 and 37. For both Examples, biaxially oriented dual-layer polypropylene film of 30 micron thickness was made on a simultaneous-orientation tenter similar to those disclosed in U.S. Pat. Nos. 4,675,582; 4,825,111; 4,853,602; 5,036,262; 5,051,225; and 5,072,493. The polypropylene resin used was a 65/35 blend of FINA 3374 and FINA 3571 (FINA Oil and Chemical Co., Dallas, Tex.). The second, or skin, layer was linear low density polyethylene CM27057-F (Eastman Chemical, Kingsport, Tenn.) and comprised 3% of the total film thickness. The two polymers were extruded at approximately 235° C. Stretching was performed at about 150° C. The nominal stretch ratios for the film were about 7:1 in both the MD and the TD. This film was flame perforated in a continuous process using a Sherman™ Brand Flame Perforator (Sherman Treaters, Ltd., Thame, Oxon, U.K.). The perforation pattern used was that of Example 1 and FIG. 4. The flames were impinged on the polypropylene side of the dual-layer film. The perforated films were thermally laminated to polyethylene films using a three-roll stack having a nipped feed at a temperature of 110° C. For Example 36, the polyethylene film was an unpigmented low density polyethylene blown film. For Example 37, the polyethylene film was a silver-gray pigmented low density polyethylene film (Transco Plastic Industries, Montreal, Quebec, Canada). The composite films were coated on the free polypropylene side with a standard weight of a standard duct tape adhesive. Results of the Tear Tests for these and the commercially available tapes are shown in Table 4.

TABLE 4

| Example No. | Tape | TD Tear Initiation Force (kg) | TD Elongation at Tear Initiation (cm) | TD Tear Initiation Energy (cm-kg) | MD Tear Initiation Force (kg) | MD Elongation at Tear Initiation (cm) | MD Tear Initiation Energy (cm-kg) |
|---|---|---|---|---|---|---|---|
| 31 | TYCO ™ 975 | 2.16 | 1.22 | 1.32 | 0.87 | 0.66 | 0.58 |
| 32 | Nashua ™ 357 Premium | 3.60 | 0.99 | 1.77 | 2.27 | 1.52 | 3.43 |
| 33 | Manco ™ Duck ™ All Purpose | 2.95 | 0.84 | 1.24 | 0.99 | 0.66 | 0.66 |
| 34 | Manco ™ Duck ™ Industrial | 2.78 | 1.47 | 2.06 | 2.35 | 2.34 | 5.46 |
| 35 | Manco ™ Duck ™ Professional | 3.17 | 1.47 | 2.35 | 2.68 | 3.40 | 9.12 |
| 36 | Inventive, Clear | 3.77 | 1.02 | 1.92 | 1.65 | 0.61 | 0.94 |
| 37 | Inventive, Pigmented | 4.23 | 1.09 | 2.34 | 2.84 | 0.86 | 2.48 |

Examples 38–42

In order to examine the contributions of the individual tape components to the tear and tensile properties of the inventive tapes of the present invention, and to further compare them to commercially available cloth-backed adhesive tapes, the following was performed. Biaxially oriented dual-layer polypropylene film of 30 micron thickness (Example 39) was made and perforated as outlined in Examples 36–37. The perforated film (Example 39) was then laminated to a silver-gray pigmented low density polyethylene blown film of 51 micron thickness (Transco Plastic Industries, Montreal, Quebec, Canada) (Example 40) by the technique described in Example 36–37. The composite film was then coated with adhesive as outlined in Examples 36–37. The equally- and simultaneously-oriented BOPP film perforated in an MD-TD symmetric pattern tended to impart similar tear and tensile properties to both the MD and TD of the finished adhesive tape (Example 41). Table 5 shows the comparison for the critical TD tear and MD tensile properties of the intermediate component films, the finished inventive pigmented tape, and a commercially available tape, 3M™ Scotch™ Brand 130 Home and Shop Duct Tape (Example 42). It can be seen that the inventive tape requires less energy to initiate and propagate a tear while offering improved tensile properties.

MD) were also employed. The biaxially oriented polypropylene film used was the same as that in Examples 3–19. Because this film has different properties in the MD and TD, changing the grid on which the centers of the perforations lie from an MD-TD symmetrical one (dimension 34=dimension 38 in FIG. 4) to an asymmetric one can be done in two distinct ways: Changing dimension 34 while holding dimension 38 constant might not be expected to yield the same result as changing dimension 38 while holding dimension 34 constant, because of the inherent film anisotropy. In all cases, the perforation number density and void density were held constant. Perforation lengths and widths were as in Example 1. The perforation was carried out using the infrared technique described in Example 1. As in Examples 3–19, the perforated films were tested without lamination of a top film. The test method was a qualitative hand tear test. Specimens were torn in both the MD and TD. A rating of "Good" was assigned to a clean straight-line tear. A rating of "Fair" was assigned to a tear with minor "jogs" off the

TABLE 5

| Example No. | Film/Tape | TD Tear Initiation Force (kg) | TD Elongation at Tear Initiation (cm) | TD Tear Initiation Energy (cm-kg) | TD Total Tear Energy (cm-kg) | TD Tear Propagation Energy (cm-kg) | MD Tensile Strength at Break (kg/cm) |
|---|---|---|---|---|---|---|---|
| 38 | 1.2 mil 7 × 7 BOPP | 8.26 | 1.68 | 7.62 | 7.62 | 0.0 | 5.86 |
| 39 | Perforated BOPP | 2.63 | 0.66 | 0.82 | 2.30 | 1.48 | 2.63 |
| 40 | 2.0 mil LDPE Blown Film | 1.86 | 2.11 | 2.56 | 6.45 | 3.89 | 1.13 |
| 41 | Inventive Adhesive Tape | 3.99 | 0.56 | 1.05 | 3.00 | 1.95 | 4.39 |
| 42 | 3M ™ Scotch ™ H&S Duct Tape | 2.63 | 1.09 | 2.11 | 13.13 | 11.02 | 3.50 |

Examples 43–66

In order to examine the effect of the grid pattern on the hand tearability of the films and tapes of the current invention, a number of different specimens were prepared having different row-to-row dimension 38 and column-to-column dimension 34 (FIG. 4). In order to detect interaction with other variables of the perforation pattern, both ovals and rectangles were used for the perforation shape, and several perforation orientation angles (with respect to the intended straight line. A rating of "Poor" was assigned to a tear with more than two "jogs" off the intended a straight line. All the films were hand tearable in at least one direction. Examples 51 and 52 are roughly equivalent to Examples 5 and 8 above, and consistently exhibited the best tear performance among these perforated films. Table 6 contains the parameters of the perforation patterns and the qualitative hand tear results.

TABLE 6

| Example No. | Dimension 34 (FIG. 4) (mm) | Dimension 38 (FIG. 4) (mm) | Perforation Shape | Perf. Major Axis Angle to MD (degrees) | TD Tear Rating | MD Tear Rating |
|---|---|---|---|---|---|---|
| 43 | 3.18 | 3.18 | Oval | 30 | Good | Good |
| 44 | 3.18 | 3.18 | Rectangle | 30 | Good | Fair |
| 45 | 3.18 | 3.18 | Rectangle | 45 | Good | Good |
| 46 | 3.18 | 3.18 | Oval | 45 | Good | Good |
| 47 | 3.18 | 3.18 | Oval | 60 | Good | Good |
| 48 | 3.18 | 3.18 | Rectangle | 60 | Good | Good |
| 49 | 3.18 | 3.18 | Oval | 60 | Good | Poor |
| 50 | 3.18 | 3.18 | Rectangle | 60 | Good | Good |
| 51 | 3.18 | 3.18 | Rectangle | 45 | Good | Good |
| 52 | 3.18 | 3.18 | Oval | 45 | Good | Good |
| 53 | 3.18 | 3.18 | Oval | 30 | Fair | Good |
| 54 | 3.18 | 3.18 | Rectangle | 30 | Good | Good |
| 55 | 1.65 | 6.15 | Oval | 45 | Poor | Good |
| 56 | 1.65 | 6.15 | Oval | 45 | Poor | Good |
| 57 | 6.15 | 1.65 | Oval | 45 | Fair | Good |
| 58 | 6.15 | 1.65 | Oval | 45 | Fair | Good |
| 59 | 2.41 | 4.19 | Oval | 45 | Good | Fair |
| 60 | 2.41 | 4.19 | Oval | 45 | Good | Fair |
| 61 | 4.19 | 2.41 | Oval | 45 | Fair | Good |
| 62 | 4.19 | 2.41 | Oval | 45 | Fair | Good |
| 63 | 2.41 | 4.19 | Oval | 30 | Good | Poor |
| 64 | 1.65 | 6.15 | Oval | 15 | Fair | Poor |

TABLE 6-continued

| Example No. | Dimension 34 (FIG. 4) (mm) | Dimension 38 (FIG. 4) (mm) | Perforation Shape | Perf. Major Axis Angle to MD (degrees) | TD Tear Rating | MD Tear Rating |
|---|---|---|---|---|---|---|
| 65 | 6.15 | 1.65 | Oval | 75 | Fair | Poor |
| 66 | 4.19 | 2.41 | Oval | 60 | Fair | Poor |

Examples 67–71

In order to examine the effect of placing the principal axes of the perforation pattern at an angle to the principal axes of the film (MD and TD), the following Examples were carried out. All preparations were made as in Examples 43–66, except that the perforation patterns, once laid out, were imposed on the film with rotation of the pattern. Thus, "columns" in the pattern were not laid down along the film MD, but at an angle to it. The hand tear tests were done along the principal axes of the perforation pattern, which now no longer corresponds to the MD and TD of the film. All films were still hand tearable, but with some noticeable degradation of the tear properties compared to similar films of Examples 43–66 whose perforation pattern axes and film principal axes align. The pattern parameters and qualitative hand tear test results are shown in Table 7.

TABLE 7

| Example No. | Dimension 34 (FIG. 4) (mm) | Dimension 38 (FIG. 4) (mm) | Perforation Shape | Perf. Major Axis Angle to Column (degrees) | Pattern Column to Film MD Angle (degrees) | TD Tear Rating | MD Tear Rating |
|---|---|---|---|---|---|---|---|
| 68 | 3.18 | 3.18 | Rectangle | 45 | 15 | Fair | Good |
| 69 | 3.18 | 3.18 | Oval | 45 | 15 | Fair | Good |
| 70 | 6.15 | 1.65 | Oval | 45 | 75 | Poor | Fair |
| 71 | 3.18 | 3.18 | Oval | 60 | 15 | Poor | Fair |
| 72 | 3.18 | 3.18 | Oval | 30 | 15 | Poor | Good |

Various modifications and alterations of this invention will be apparent to those skilled in the art without departing from the scope and spirit of this invention, and it should be understood that this invention is not limited to the illustrative embodiments set forth herein.

We claim:

1. A composite polymeric film comprising:
   (a) an oriented first polymeric film having first and second surfaces and a plurality of perforations through the first and second surfaces, the perforations having a raised ridge at their boundaries; and
   (b) a second polymeric film applied to either the first or second surface of the first polymeric film and substantially covering the perforations in the first polymeric film.

2. The composite polymeric film according to claim 1, wherein the composite polymeric film is hand tearable in at least one direction.

3. The composite polymeric film according to claim 2, wherein the composite polymeric film is hand tearable in two perpendicular directions.

4. The composite polymeric film according to claim 1, wherein the first polymeric film comprises a polyolefin.

5. The composite polymeric film according to claim 4, wherein the first polymeric film comprises polypropylene.

6. The composite polymeric film according to claim 5, wherein the first polymeric film comprises biaxially oriented polypropylene.

7. The composite polymeric film according to claim 6, wherein the first polymeric film comprises biaxially oriented polypropylene which has been stretched to substantially equal draw ratios in the machine direction and the transverse direction.

8. The composite polymeric film according to claim 6, wherein the first polymeric film comprises biaxially oriented polypropylene which has been stretched to greater draw ratio in the machine direction than in the transverse direction.

9. The composite polymeric film according to claim 6, wherein the first polymeric film comprises biaxially oriented polypropylene which has been stretched to greater draw ratio in the transverse direction than in the machine direction.

10. The composite polymeric film according to claim 1, wherein the first polymeric film comprises a polyester.

11. The composite polymeric film according to claim 10, wherein the polyester comprises polyethylene terephthalate.

12. The composite polymeric film according to claim 1, wherein the first polymeric film comprises a layer of a first polymer and a layer of a second polymer.

13. The composite polymeric film according to claim 12, wherein the first polymer comprises a polyolefin.

14. The composite polymeric film according to claim 13, wherein the second polymer comprises a polyolefin.

15. The composite polymeric film according to claim 14, wherein the first polymer comprises polypropylene and the second polymer comprises a polyethylene.

16. The composite polymeric film according to claim 1, wherein the second polymeric film is oriented.

17. The composite polymeric film according to claim 5, wherein the second polymeric film comprises a polyolefin.

18. The composite polymeric film according to claim 17, wherein the second polymeric film comprises a polyethylene.

19. The composite polymeric film according to claim 18, wherein the second polymeric film comprises a low density polyethylene, a linear low density polyethylene, or combinations thereof.

20. The composite polymeric film according to claim 17, wherein the second polymeric film comprises a polypropylene.

21. The composite polymeric film according to claim 5, wherein the second polymeric film comprises a polyurethane.

22. The composite polymeric film according to claim 1, wherein the second polymeric film comprises a multilayered film.

23. The composite polymeric film according to claim 22, wherein the multilayered second polymeric film comprises an absorber or blocker for ultraviolet light.

24. The composite polymeric film according to claim 1, further comprising a pigment.

25. The composite polymeric film according to claim 1, wherein the second polymeric film comprises a pigment.

26. The composite polymeric film according to claim 1, wherein the perforations in the first polymeric film are non-circular and have a length at least 1.5 times their width.

27. The composite polymeric film according to claim 26, wherein the perforations in the first polymeric film have a length at least 2 times their width.

28. The composite polymeric film according to claim 1, wherein the perforations have a major axis and a minor axis, and an extension of the major axis of a first perforation passes through an adjacent second perforation.

29. The composite polymeric film according to claim 28, wherein the major axis of the first perforation passes through the center of the second perforation.

30. The composite polymeric film according to claim 26, wherein the perforations in the first polymeric film are arranged with their longest dimension at an angle of between 40 and 50 degrees to the machine direction.

31. The composite polymeric film according to claim 26, wherein the perforations in the first polymeric film are arranged with their longest dimension at an angle of approximately 45 degrees to the machine direction.

32. The composite polymeric film according to claim 31, wherein the perforations in the first polymeric film are arranged in alternating rows with the perforations in each row oriented at approximately 90 degrees to the perforations in adjacent rows.

33. The composite polymeric film according to claim 1, wherein the second polymeric film is applied to the first surface of the first polymeric film, and further comprising a third polymeric film applied to the second surface of the first polymeric film.

34. The composite polymeric film according to claim 1, further comprising an adhesive composition positioned on an exterior surface of the composite polymeric film.

35. The composite polymeric film according to claim 34, wherein the adhesive is a pressure sensitive adhesive.

36. The composite polymeric film according to claim 1, wherein the composite polymeric sheet has a tear propagation force at least 10 percent of the tear initiation force according to the Tear Test in at least one direction.

37. The composite polymeric film according to claim 1, wherein the composite polymeric sheet has a break strength of at least 1.0 kg/cm.

38. The composite polymeric film according to claim 1, wherein the composite polymeric sheet has an elongation to break of less than 40 percent.

39. The composite polymeric film according to claim 2, wherein the composite polymeric sheet emits an audible ripping sound when torn by hand.

40. A polymeric sheet comprising:
   a polymeric film having a first and second surface; and
   a plurality of perforations in the polymeric film extending through the first and second surfaces, the perforations each defining an open area therewithin and having a raised ridge at their boundaries, and the perforations having a length greater than their width;
   wherein the perforations are arranged such that an extension of the major axis of each of perforation extends through an adjacent perforation.

41. The polymeric sheet according to claim 40, wherein the perforations have a length at least 1.5 times greater than their width.

42. The polymeric sheet according to claim 40, wherein the perforations have a length at least 2 times greater than their width.

43. The polymeric sheet according to claim 40, wherein each of the plurality of perforations has a major axis and a minor axis, and the major axis of each perforation extends through at least one adjacent perforation.

44. The polymeric sheet according to claim 40, further comprising a second polymeric sheet secured to the first polymeric sheet.

45. The polymeric sheet according to claim 40, wherein the first polymeric sheet comprises an oriented polymeric material.

46. A composite polymeric sheet comprising:
   a first polymeric material having a plurality of perforations having a raised ridge at their boundaries; and
   a second polymeric material affixed to the first polymeric material,
   wherein the composite polymeric sheet has a tear propagation force at least 10 percent of the tear initiation force in at least one direction.

47. The composite polymeric sheet according to claim 46, wherein the composite polymeric sheet is hand tearable.

48. The composite polymeric sheet according to claim 46, wherein the composite polymeric sheet is hand tearable in two perpendicular directions.

49. A method of making a composite polymeric film, the method comprising:
   (a) providing an oriented polymeric film comprising a first polymeric composition;
   (b) perforating the oriented film, the perforations having a raised ridge at their boundaries;
   (c) applying a second polymeric composition to the oriented polymeric film.

50. The method according to claim 49, wherein the first polymeric film comprises polypropylene.

51. The method according to claim 49, wherein the first polymeric film comprises a multi-layer film having a first layer of polypropylene and a second layer of polyethylene.

52. The method according to claim 49, wherein the polyethylene layer is between 1 and 10 percent of the thickness of the polypropylene layer.

53. The method according to claim 49, wherein the film is biaxially oriented.

54. The method according to claim 49, wherein the film is perforated with an infrared light source.

55. The method according to claim 49, wherein the film is perforated with a flame.

56. The method according to claim 49, wherein the second polymeric composition is extrusion coated onto the first polymeric composition.

57. The method according to claim 49, wherein the second polymeric composition is laminated onto the first polymeric composition.

58. A composite polymeric film comprising:
   (a) an oriented first polymeric film having first and second surfaces and a plurality of perforations through the first and second surfaces, the perforations having a raised ridge at their boundaries; and
   (b) a second polymeric film applied to either the first or second surface of the first polymeric film and substantially covering the perforations in the first polymeric film wherein the composite polymeric film is hand tearable in two perpendicular directions.

59. A composite polymeric film comprising:

(a) an oriented first polymeric film having first and second surfaces and a plurality of perforations through the first and second surfaces, the perforations each defining an open area therewithin in the first film and having a raised ridge at their boundaries; and (b) a second polymeric film applied to either the first or second surface of the first polymeric film and substantially covering the perforations in the first polymeric film.

60. The composite polymeric film of claim 59 wherein the perforations are elongate ovals, rectangles or other non-circular shapes.

61. A composite polymeric film comprising:

(a) an oriented first polymeric film having first and second surfaces and a plurality of perforations through the first and second surfaces, the perforations having a raised ridge at their boundaries;

(b) a second polymeric film applied to either the first or second surface of the first polymeric film and substantially covering the perforations in the first polymeric film; and (c) an adhesive composition positioned on an exterior surface of the composite polymeric film.

* * * * *

UNITED STATES PATENT AND TRADEMARK OFFICE
CERTIFICATE OF CORRECTION

PATENT NO. : 6,635,334 B1
DATED : October 21, 2003
INVENTOR(S) : Jackson, Jeffrey N.

It is certified that error appears in the above-identified patent and that said Letters Patent is hereby corrected as shown below:

Title page,
Item [56], References Cited, U.S. PATENT DOCUMENTS, delete "6/1962" and insert in place thereof -- 3/1960 --;
FOREIGN PATENT DOCUMENTS delete "7/1967" and insert in place thereof -- 12/1965 --; and insert -- GB     1073605            7/1967 --.
Item [57], ABSTRACT,
Line 7, after "use" insert -- with --.

Column 1,
Line 21, delete "principle" and insert in place thereof -- principal --.

Column 4,
Line 18, delete "perorations" and insert in place thereof -- perforations --.

Column 17,
Line 44, delete "TYCOT$^{TM}$" and insert in place thereof -- TYCO$^{TM}$ --.

Column 19,
Line 7, delete "Example" and insert in place thereof -- Examples --.

Column 20,
Line 35, after "intended" delete "a".

Column 21,
Table 7, delete Example No. "68" and insert in place thereof -- 67 --.
Table 7, delete Example No. "69" and insert in place thereof -- 68 --.
Table 7, delete Example No. "70" and insert in place thereof -- 69 --.
Table 7, delete Example No. "71" and insert in place thereof -- 70 --.
Table 7, delete Example No. "72" and insert in place thereof -- 71 --.

UNITED STATES PATENT AND TRADEMARK OFFICE
CERTIFICATE OF CORRECTION

PATENT NO. : 6,635,334 B1
DATED : October 21, 2003
INVENTOR(S) : Jackson, Jeffrey N.

It is certified that error appears in the above-identified patent and that said Letters Patent is hereby corrected as shown below:

Column 22,
Line 16, delete "ratio" and insert in place thereof -- ratios --.
Line 24, delete "ratio" and insert in place thereof -- ratios --.

Signed and Sealed this

Twenty-fifth Day of May, 2004

JON W. DUDAS
*Acting Director of the United States Patent and Trademark Office*